(12) United States Patent
Nickel

(10) Patent No.: US 6,640,190 B2
(45) Date of Patent: Oct. 28, 2003

(54) ESTIMATING SUBSURFACE SUBSIDENCE AND COMPACTION

(75) Inventor: Michael Nickel, Stavanger (NO)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/076,693

(22) Filed: Feb. 15, 2002

(65) Prior Publication Data

US 2002/0173917 A1 Nov. 21, 2002

(30) Foreign Application Priority Data

Feb. 22, 2001 (GB) .............................................. 0104362

(51) Int. Cl.[7] .................................................. G01V 1/50
(52) U.S. Cl. .............................................. 702/14; 702/7
(58) Field of Search ................................ 702/14, 7, 16; 73/84, 152.54, 152.01; 367/72

(56) References Cited

U.S. PATENT DOCUMENTS

| | | | | |
|---|---|---|---|---|
| 5,753,813 A | * | 5/1998 | Hagiwara | 73/152.54 |
| 6,018,499 A | * | 1/2000 | Sethian et al. | 367/72 |
| 6,351,991 B1 | * | 3/2002 | Sinha | 73/152.01 |
| 6,411,902 B1 | * | 6/2002 | Wiltshire | 702/7 |
| 2002/0087272 A1 | * | 7/2002 | Mackie | 702/14 |

FOREIGN PATENT DOCUMENTS

| | | | | |
|---|---|---|---|---|
| EP | 1 058 131 A1 | | 12/2000 | ............ G01V/1/30 |
| GB | 2 317 451 | | 3/1998 | ............ G01V/1/30 |
| WO | WO 96/27141 | * | 9/1996 | ............ G01V/1/30 |
| WO | WO 98/11455 | * | 3/1998 | ............ G01V/1/28 |
| WO | WO 99/67660 | | 12/1999 | ............ G01V/1/28 |

OTHER PUBLICATIONS

Bernard, Christophe P. "Discrete Wavelet Analysis: A New Framework foir Fast Optic Flow Computation", Computer Science (Jun. 1998), vol. 1407, pp. 354–368.

Gardner, G. H. F. et al. "Formation Velocity and Density–The Diagnostic Basic for Stratigraphic Traps", Geophysics (Dec 1974), vol. 39, No. 6, pp. 770–778.

Robinson, Enders A. "Seismic Velocity Analysis and the convolutional Model", pp. 1–56.

* cited by examiner

Primary Examiner—John Barlow
Assistant Examiner—Victor J. Taylor
(74) Attorney, Agent, or Firm—William B. Batzer; John J. Ryberg

(57) ABSTRACT

A method of processing first and second sets of data signals obtained through remotely sensing properties of the same subsurface area at different times comprising the steps of decomposing said first and second data sets into subvolumes of samples and generating subsidence estimates indicating the amount and direction the samples from said first data set need to be translated to obtain a new representation of said first data subvolume that maximally resembles said second subvolume. Preferably, the method further includes the step of derivating said subsidence estimates along the vertical direction in order to generate samples indicating the relative local compaction of the subsurface.

26 Claims, 13 Drawing Sheets

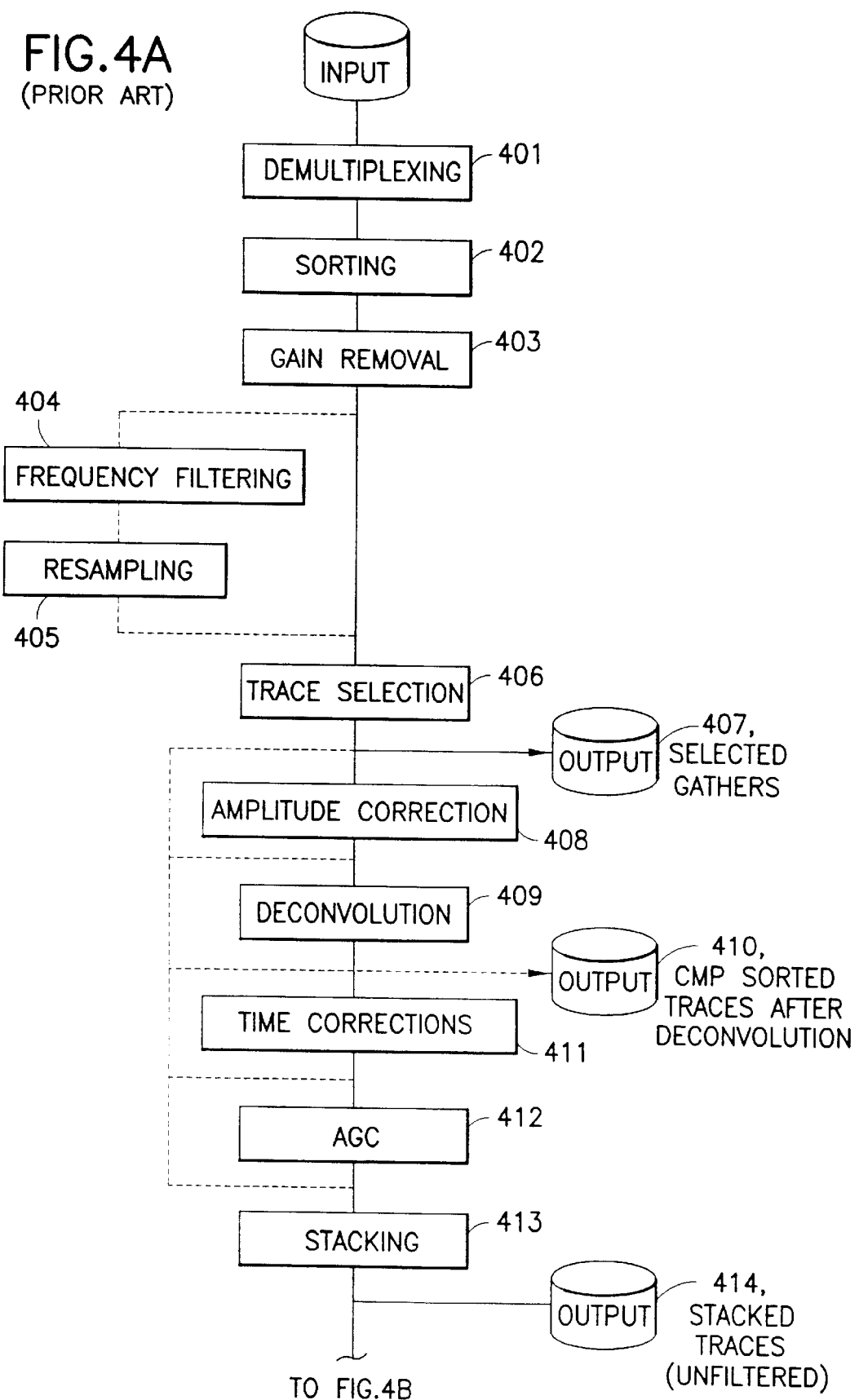

ESTIMATING SUBSURFACE SUBSIDENCE AND COMPACTION

BACKGROUND OF THE INVENTION

The present invention relates to a procedure and apparatus for the acquisition, processing, and inversion of two or more sets of data signals obtained from the same subsurface area—preferably, but not restricted to—seismic data signals. In particular, the inversion method aims at estimating the subsidence and compaction of geological strata in the underground. Compaction can be furthermore inverted into material attributes such as acoustic impedance or strain and stress fields. These attributes have important relevance to avoid hazards when drilling new wells into the subsurface and for monitoring hydrocarbon reservoirs under production. This patent application is related to commonly-assigned International Patent Application PCT/IB99/01144 entitled "Method for Processing Time Lapsed Seismic Data Signals", published Dec. 29, 1999 as WO99/67660, incorporated herein by reference.

Seismic data signals are typically acquired by measuring and recording data during a "3D seismic survey". A "3D seismic survey" in general is performed by conducting a plurality of "seismic experiments" i.e. typically by firing an impulsive seismic energy source at the surface of the earth/sea or seafloor and recording the received signals at a set of geo/hydro-phones. The geo/hydro-phones are typically situated at the same surface as the source, but laterally displaced on regular grid positions. However, there are situations where a non-regular distribution of the geo/hydro-phones is preferred and/or where the source and the set of geo/hydro-phones are positioned at different depth levels.

In a "3D seismic survey", one will typically displace the source and sets of geo-/hydro-phones at fixed intervals (e.g. 25 meters) and in a certain direction (the "Inline" direction) and repeat the seismic experiment of firing the source and recording the received signals. After completion of such an inline recording, one will repeat this procedure so the source and the set of receivers are displaced a certain distance perpendicular to the inline direction. By this, one will scan the surface of the earth over an area of interest and thus complete a 3D seismic survey. The recording of a single inline can also be denoted as a 2D seismic survey.

During a seismic experiment, when firing the seismic source, a pressure wave will be excited and propagate into the subsurface. The pressure wave reflects off interfaces between various earth layers (such as rock, sand, shale, and chalk layers), and propagates upwardly to the set of geo/hydro-phones, where respectively the particle velocity of the wave vibrations or the pressure oscillations of the wave are measured and recorded. The strength of the reflected wave is proportional to the amount of change in elastic parameters (represented e.g. through density, pressure velocity, and shear velocity) at the respective interfaces. Consequently, the data recorded by the set of geo/hydro-phones represents the elastic characteristics of the subsurface below the set of geo/hydro-phones. However, in order to arrive at volumetric images of the subsurface the recorded signals have to be processed using a (preferably state of the art) processing scheme. Essentially, such a scheme reduces noise and focuses and maps the seismic signals to the points where the reflections occurred.

Often two or more 3D seismic surveys are obtained from the same subsurface area but at different times, typically with time lapses of between a few month and a few years. In some cases, the seismic data signals will be acquired to monitor changes in the subsurface reservoirs caused by the production of hydrocarbons. The acquisition and processing of time-lapsed three dimensional seismic surveys over a particular subsurface area (commonly referred to in the industry as "4D" seismic data) has emerged in recent years as an important new prospecting methodology.

The purpose of a 4D seismic survey is to monitor changes in the seismic data signals that can be related to detectable changes in geological parameters. These (not necessarily independent) geologic parameters include fluid fill, propagation velocities, porosity, density, pressure, temperature, settlement of the overburden, etc. Of primary interest are changes taking place in the hydrocarbon reservoir zones of the imaged subsurface volume. Analysing these changes together with petroleum production data assists the interpreter in understanding the complex fluid mechanics of the system of migration paths, traps, and draining or sealing faults making up the hydrocarbon reservoir. This provides information regarding how to proceed with the exploitation of the field: where to place new production wells to reach bypassed pay and where to place injectors for enhanced oil recovery. In the case of deciding where to place well trajectories, the situation in the reservoir overburden becomes of interest as well. It is important to know the in situ stress field and especially over-pressured zones to avoid well breakdowns. All this helps to produce a maximum quantity of hydrocarbons from the reservoir at a minimum of cost.

Two important 4D seismic attributes are subsidence and compaction/stretching (the rate of change in subsidence with depth). A conventional method to measure subsidence from seismic data is to interpret corresponding horizons on two surveys of a seismic time lapse data set and calculate the difference in the two-way traveltime (assuming that the depth coordinate of the subsurface volume is measured in time). Correspondingly, a measure for compaction is to estimate the subsidence for the upper and lower horizon delineating a geological layer and calculate the difference in subsidence.

It is an object of the present invention to provide an improved method of processing time-lapse seismic data signals to estimate subsidence and preferably compaction of the imaged subsurface volume. An advantage of the present invention is that it provides first a more robust/less noise affected compaction estimate and second an estimate with higher resolution in that there is preferably generated a compaction estimate for each volume element making up the subsurface volume instead of being restricted to layers defined by horizons.

Another important aspect of the present invention is a link demonstrating how to relate the kinematic effect of compaction to changes in elastic parameters such as acoustic impedance.

SUMMARY OF THE INVENTION

The present invention relates generally to the processing of time-lapsed data of a subsurface volume and more particularly to a method of estimating the subsidence and preferably the compaction or stretching of geological strata in the subsurface. Another aspect of the invention is how to refine a compaction estimate into an estimate indicating the relative change in acoustic impedance.

In one embodiment, the method involves collecting two time-lapsed sets of seismic data and generating a new data volume indicating the amounts and direction (upwards or downwards) by which the samples of the first seismic data set have to be translated in order to arrive at a representation that best resembles the second seismic data set. Subsequently the derivative with respect to the depth direction may be calculated to arrive at the compaction estimate. Recognising that compaction corresponds to an increase in density; an empirical mapping relates compaction to changes in the relative acoustic impedance.

The method is of benefit in the field of monitoring hydrocarbon reservoirs with time lapsed measurements and will give indications of undrained reservoir areas and possible stress regimes in the overburden. The invention and its benefits will be better understood with reference to the detailed description below and the accompanying drawings.

BRIEF DESCRIPTION OF THE DRAWINGS

FIGS. 4A and 4B show a process flow diagram of a typical processing sequence to reduce seismic data;

DETAILED DESCRIPTION OF THE INVENTION

Figure 1:
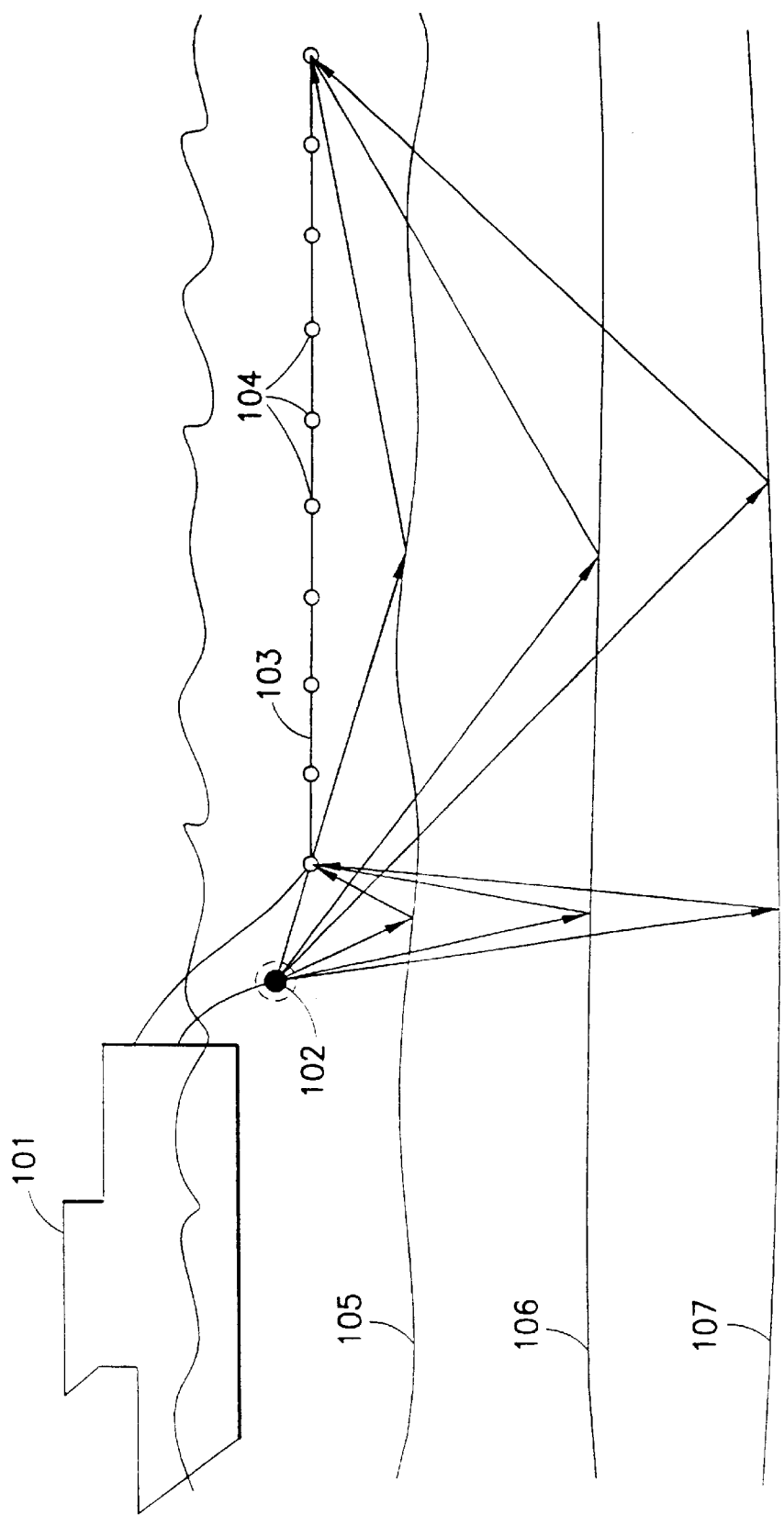
FIG. 1 is a schematic diagram of the process of obtaining seismic data signals from a subsurface area in a marine environment.

FIG. 1 shows the conventional process of obtaining seismic data signals in a marine environment. A seismic survey vessel 101 is used to tow a seismic source, such as an airgun 102 and seismic sensor arrays, such as streamer 103. The streamer 103 contains a plurality of hydro-phones 104 which sense acoustic impulses and transmit the seismic data signals, referred to as seismic traces, to the seismic survey vessel 101 where they are recorded. The airgun 102 produces a series of acoustic pulses, which penetrate through the seabed 105 and are reflected by boundaries 106 and 107 between the geologic layers that have differing elastic properties. Often two or more of the streamers 103 will be towed behind the seismic survey vessel 101 and a three dimensional set of seismic data signals will be obtained. The process shown in FIG. 1 is well known in the art and, in and of itself, forms no part of the present invention. Further, although the exemplified embodiment of the current invention relates to marine seismic surveying, it is to be understood that this is no limitation of the invention.

Figure 2:
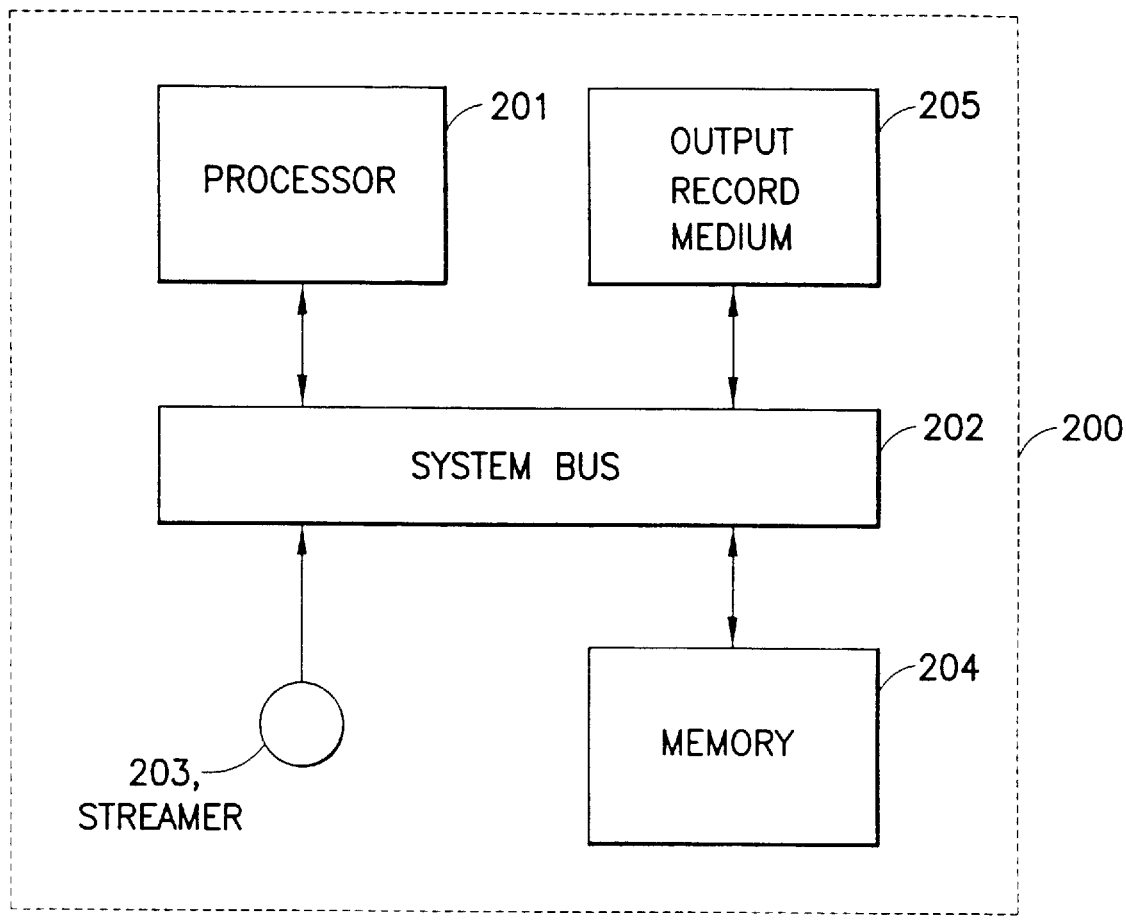
FIG. 2 is a block diagram of a seismic data acquisition system.

Referring now to FIG. 2, there is provided a diagram showing a recording system 200 for seismic signals in accordance with a preferred embodiment of the present invention. The recording system 200 is composed of a processor 201 connected to a system bus 202. Processor 201 receives seismic data signals from the towed streamers 203 (106 with reference to FIG. 1) via the system bus 202. The processor 201 will perform low-level signal processing, for example noise reduction. The recorded seismic data volume may be stored on the memory 204 in digital form before transferring it to an output medium 205 which may, for instance, be a magnetic tape, optical disks, or a (wireless) network.

Figure 3:
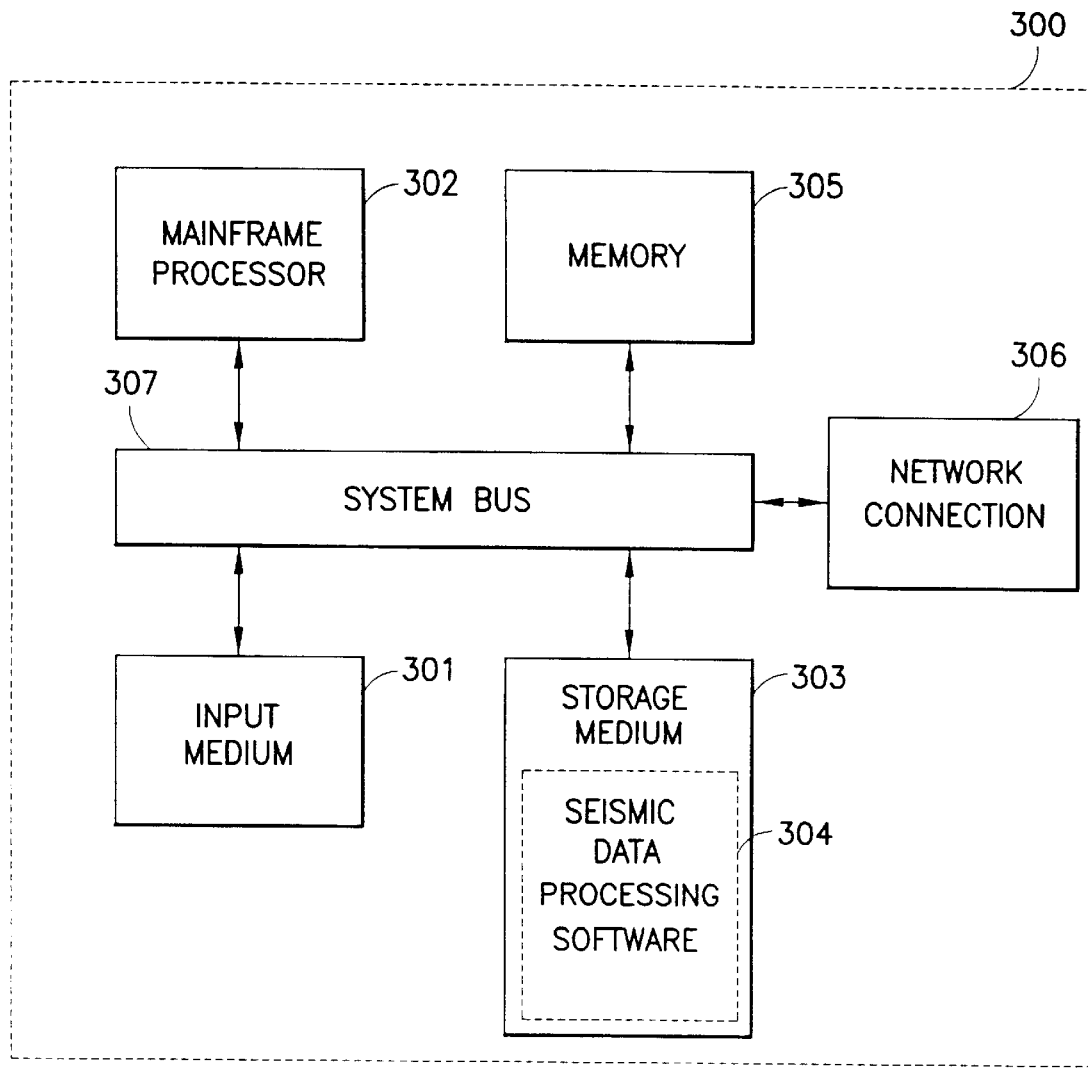
FIG. 3 is a block diagram of a seismic data processing and reduction mainframe computer system.

In a next step, the seismic data volume will typically be uploaded to a processing system 300 that may, in accordance with the present invention, have a configuration as shown in FIG. 3. An input medium 301, a mainframe processor 302, a storage medium 303 holding processing software 304, memory 305 to store data, and a network access medium 306 are connected to a system bus 307. In a typical processing suite, the seismic data volume will be uploaded using the input medium 301 and stored in the memory 305. The mainframe processor 302 will perform several operations on the seismic data in order to enhance and reduce these data. The processing sequence can be adapted in order to optimise the output by choosing operators for data processing from a library stored on medium 303.

Figure 4B:
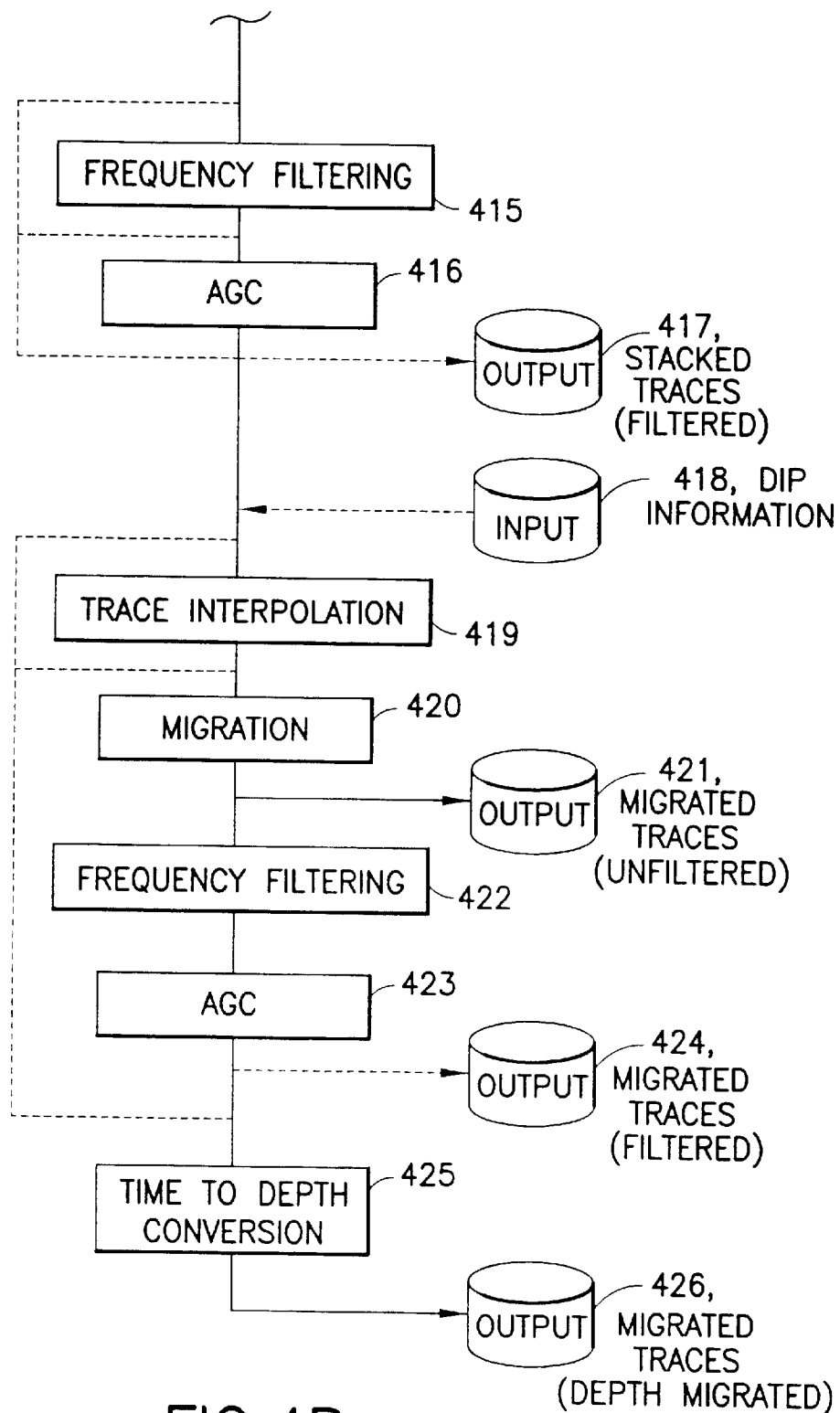
Figure 5:
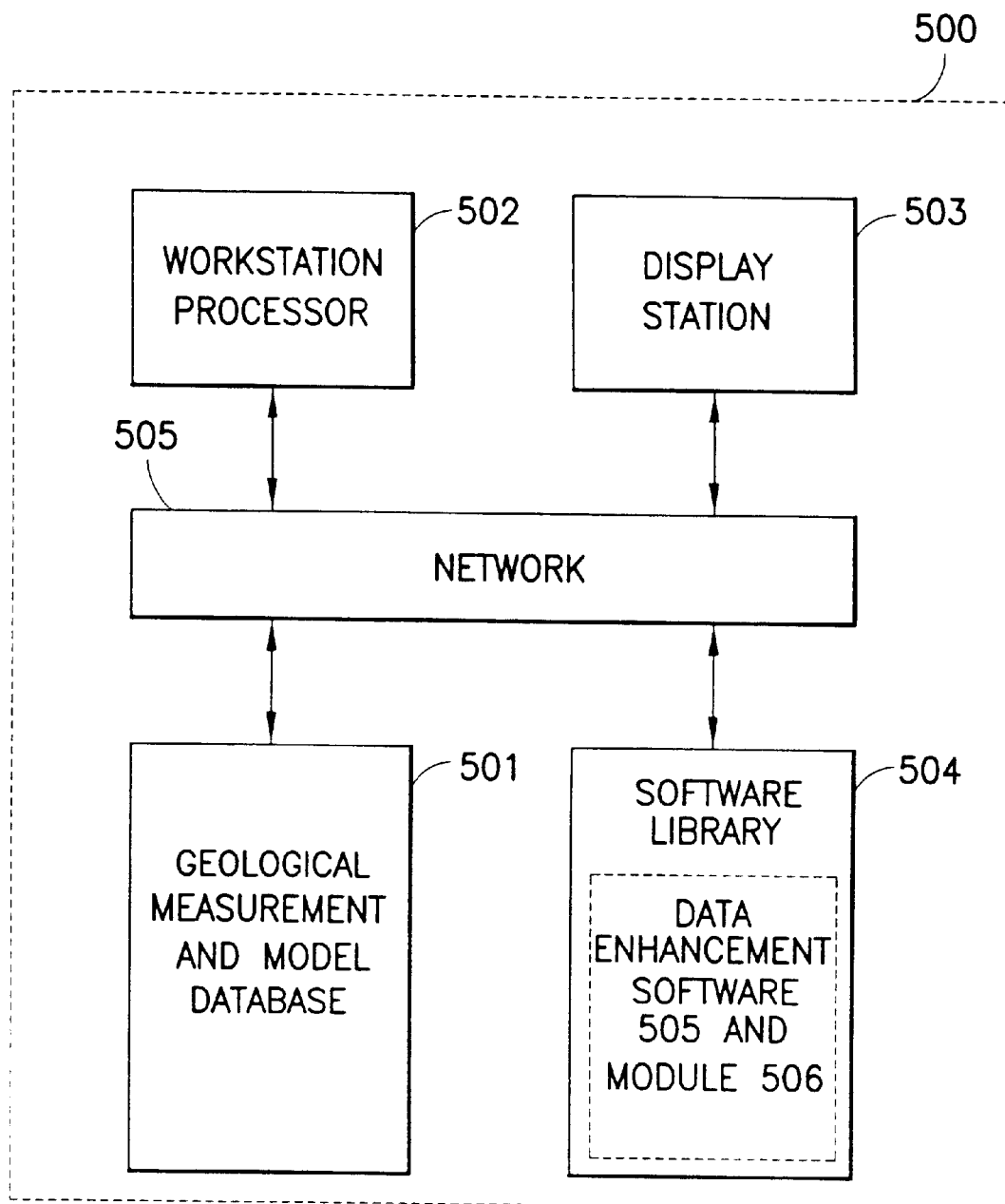
FIG. 5 illustrates a workstation and display used to refine and analyse processed seismic data.

A typical processing sequence in accordance with the current invention where the processing operators were picked from a library residing in 303 is shown as a flowchart in FIGS. 4A and 4B. The flowchart is taken from a book entitled "Seismic Velocity Analysis and the Convolutional Model" by Enders A. Robinson and as such represents prior art techniques.

In FIGS. 4A and 4B, the flowchart of the processing sequence includes the following blocks: a demultiplexing block 401 connected to the input, a sorting block 402, a gain removal block 403, a frequency filtering block 404, a resampling block 405, a trace selection block 406, an output 407 labelled "selected gathers", amplitude correction 408, deconvolution 409, a second output 410 labelled "CMP sorted traces after deconvolution", a time correction block 411, an AGC block 412, a stacking block 413, a third output 414 labelled "stacked traces (unfiltered)", a frequency filtering block 415, another AGC block 416, a fourth output 417 labelled "stacked traces (filtered)", a second input 418 labelled "dip information", a trace interpolation block 419, a migration block 420, a fifth output 421 labelled "migrated traces (unfiltered)", a frequency filtering block 422, an AGC block 423, a sixth output 424 labelled "migrated traces (filtered)", a time to depth conversion block 425, and a seventh output 426 labelled "migrated traces (depth migrated)". In the flowchart of FIGS. 4A and 4B, any of the outputs 407, 410, 414, 417, 421, 424, and 426 can be used as input to a workstation for estimating subsidence and compaction as discussed in detail below.

With reference to FIG. 3, FIG. 4A, FIG. 4B, and FIG. 5, the output 407, 410, 414, 417, 421, 424, or 426 of the seismic data processing and reduction sequence will be typically stored in a database 501 holding geological measurements and geological models, and which can be reached from the processing system 300 via a network connection 306.

Furthermore, the acquisition and subsequent processing of seismic signal data, as described above and referenced in FIGS. 1 through 4A and 4B, will be, in accordance with a preferred embodiment of the invention, repeated at least once and often several times to image the same subsurface area. The time lapse interval between acquisitions varies typically from a couple of months to a couple of years and will be chosen amongst other factors with regard to the sensitivity of the acquisition system to monitor subtle changes in the subsurface due to hydrocarbon production artefacts. The output of each acquired and processed time lapsed seismic survey will be typically stored in the same geological database 501.

The database 501 forms part of a data analysis and enhancement system 500, which in addition consists of a workstation processor 502, a display station 503 and a software library 504 holding data enhancement application software 505 and in particular the module 506 to estimate subsidence and compaction which is described in detail below.

Figure 6:
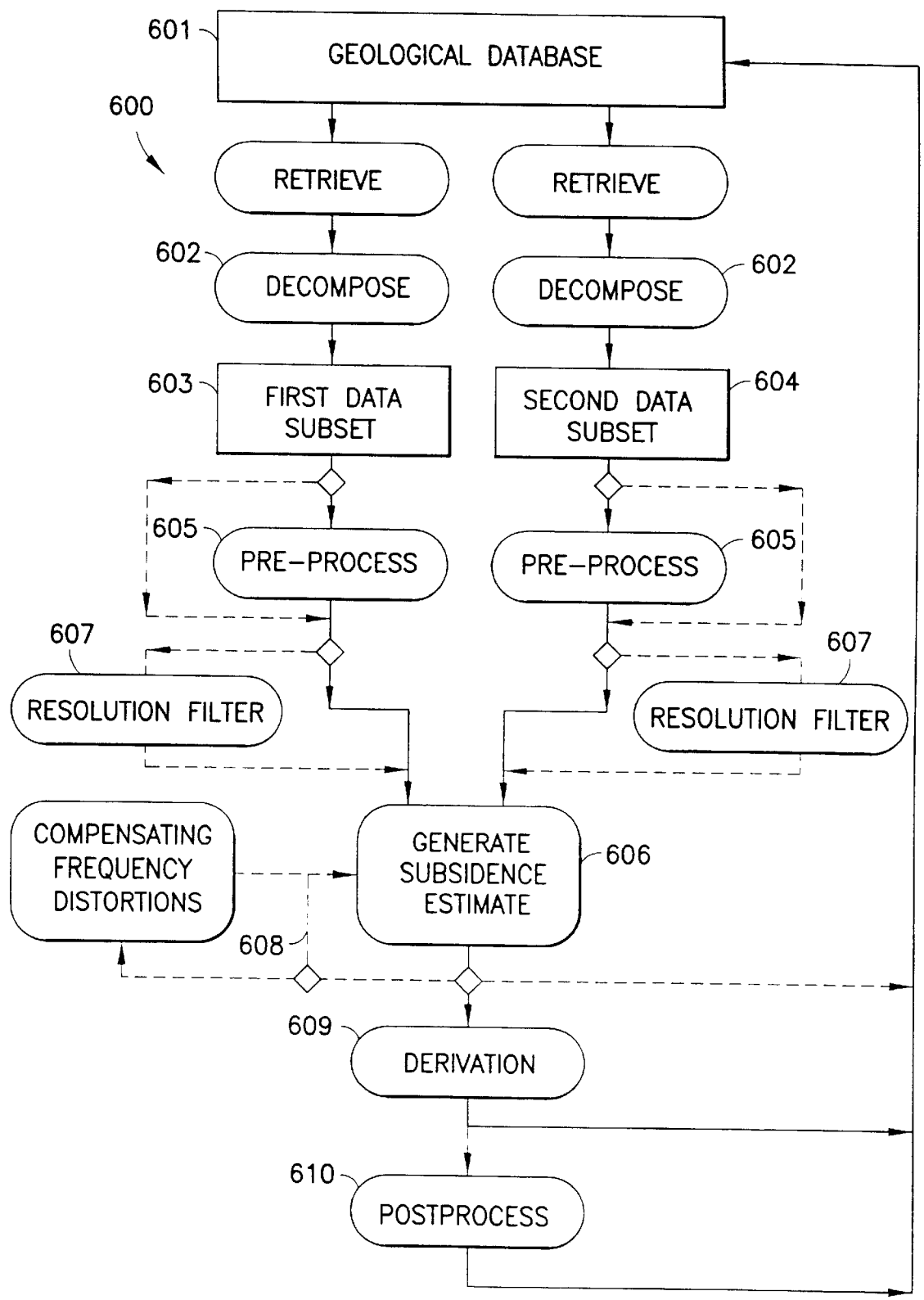
FIG. 6 shows a flow diagram of steps associated with the estimation of a subsidence and a compaction volume.

Referring now to FIG. 6, there is provided a flow scheme 600 showing processing steps associated with a preferred embodiment in order to estimate subsidence and compaction in the subsurface in accordance with the present invention.

Two time-lapsed seismic data sets are retrieved from the geological measurement and model database 601 and may be subjected a decomposition step 602. The decomposition step may consist of extracting corresponding subsets of traces or subtraces from each of the two 3D time lapsed data sets. Here the term "trace" is recognised by those familiar with the art as a set of seismic data samples stemming from the same lateral position, but from varying depths and a "subtrace" is again a subset of seismic data samples of a trace. Said sets of (sub)traces may stem from what is know in the art as an inline or a cross-line or a random line of the retrieved 3D data sets. In case the acquired seismic data stem from a 2D survey, the decomposition step would result in what is known in the art as a subsection. The decomposition step results thus in two data subsets 603 and 604. These data subsets may then be subjected to a pre-processing step 605, before using them as input to a subsidence estimation process 606. The subsidence estimation process generates a value for each sample of said first subset indicating how much said sample must be translated downwards in order to match the samples of the corresponding (sub)trace of said second subset. This process is repeated for all corresponding pairs of (sub)traces being part of the subsets.

The estimation of the subsidence values for corresponding traces is preferably performed by calculating the following quantities in an iterative manner:

$$s_i(x, y, z) = s_{i-1}(x, y, z) + \Delta s_i(x, y, z)$$

$$\Delta s_i(x, y, z) = \frac{g_{z,i}(x, y, z) \cdot \Delta g_i(x, y, z)}{\alpha + g_{z,i}(x, y, z) \cdot g_{z,i}(x, y, z)} + \beta(\bar{s}_{i-1}(x, y, z) - s_{i-1}(x, y, z)).$$

Here, $s_i(x, y, z)$ is the estimated subsidence at iteration i for a sample z of a trace with the lateral position indices x and y. $\Delta s_i(x, y, z)$ indicates the subsidence increment and $$\bar{s}_{i-1}(x, y, z) = \sum_{\xi=-2}^{2} s_{i-1}(x, y, z+\xi)$$

is the local average subsidence.

Furthermore, $g_{z,i}(x, y, z)$, is the average derivative along the z-direction (trace direction) at sample z for the trace with the lateral position indices x and y at iteration i, given by:

$$g_{z,i}(x, y, z) = \frac{1}{2}\left(\frac{\partial}{\partial z}g_{ref}(x, y, z) + \frac{\partial}{\partial z}g_i(x, y, z)\right)$$

where $g_{ref}(x, y, z)$ is a trace from the first (reference) trace subset and $g_i(x, y, z)$ is the subsidence compensated version of the corresponding trace from the second trace subset, $g_{time\text{-}lapsed}(x, y, z)$, at iteration i. The latter quantity is obtained by translating the samples of $g_{time\text{-}lapsed}(x, y, z)$ an amount given by the subsidence estimate of iteration i−1, but in the opposite direction:

$$g_i(x,y,z)=I[g_{time\text{-}lapsed}(x,y,z-s_{i-1}(x,y,z))]$$

where I denotes an interpolation operator. Interpolation is necessary because subsidence values are allowed to be fractions of a sample size Δz, in which case it is not possible to compensate for the subsidence effect by translating the signal through shifting sample indices. Instead, the trace signal is represented by an analytical (continuous) model, which can be translated to an arbitrary position and then again resampled to its original sampling rate. Those skilled with the art will recognise that such an interpolation operator can be linear or have some higher order. At the first iteration, the subsidence is initialised as $s_0(x, y, z)=0$.

Further, the derivative $$\frac{\partial}{\partial z}$$

can be implemented using a finite difference or higher order schemes, the latter being less prone to noise.

The residual signal $\Delta g_i(x, y, z)$ at iteration i, is obtained by:

$$\Delta g_i(x, y, z)=g_i(x, y, z)-g_{ref}(x, y, z)$$

Finally, α is a parameter controlling the smoothness of the subsidence estimate and β is a parameter controlling the smoothness of the change of the subsidence along direction z. An appropriate choice of these parameters will guarantee a robust estimation result.

The above described iteration scheme will be run for a fixed number of iterations or until the subsidence increment drops below a threshold set by a user of the invention.

The final subsidence estimate is thus given by:

$$s(x, y, z) = s_N(x, y, z) = \sum_{i=1}^{N} \Delta s_i(x, y, z)$$

Often the quality of the resulting subsidence estimate will be improved if a multi-resolution scheme is applied. Such a scheme may be implemented using a filter 607 and a feedback loop 608. The purpose of the filter 607 is to smooth the input subset of traces along preferably, but not restricted to, all three directions in order to generate a less detailed representation of the subsurface. Those skilled with the art of digital signal processing will understand that the filter bandwidth may be adapted to the properties of the input signal along its different directions. At a first step of a multi-resolution scheme, the filtering will be significant, resulting in very coarse representation of the subsets. These filtered versions are then used to estimate a version of the total subsidence. At the next step of the multi-resolution scheme, the smoothing filter will have an increased bandwidth resulting in a representation of the input trace subsets with more details. Again the total subsidence is estimated, however now initialising $s_0(x,y,z)$ with the subsidence estimate of the previous resolution step. In consecutive resolution steps, the bandwidth of the smoothing filter will be more and more increased until the full bandwidth (no filtering) is obtained. Each time the total subsidence is estimated, the iteration scheme is started with the output of the previous resolution step. The output of the final resolution step corresponds to the resulting subsidence estimate of the whole processing.

Figure 7:
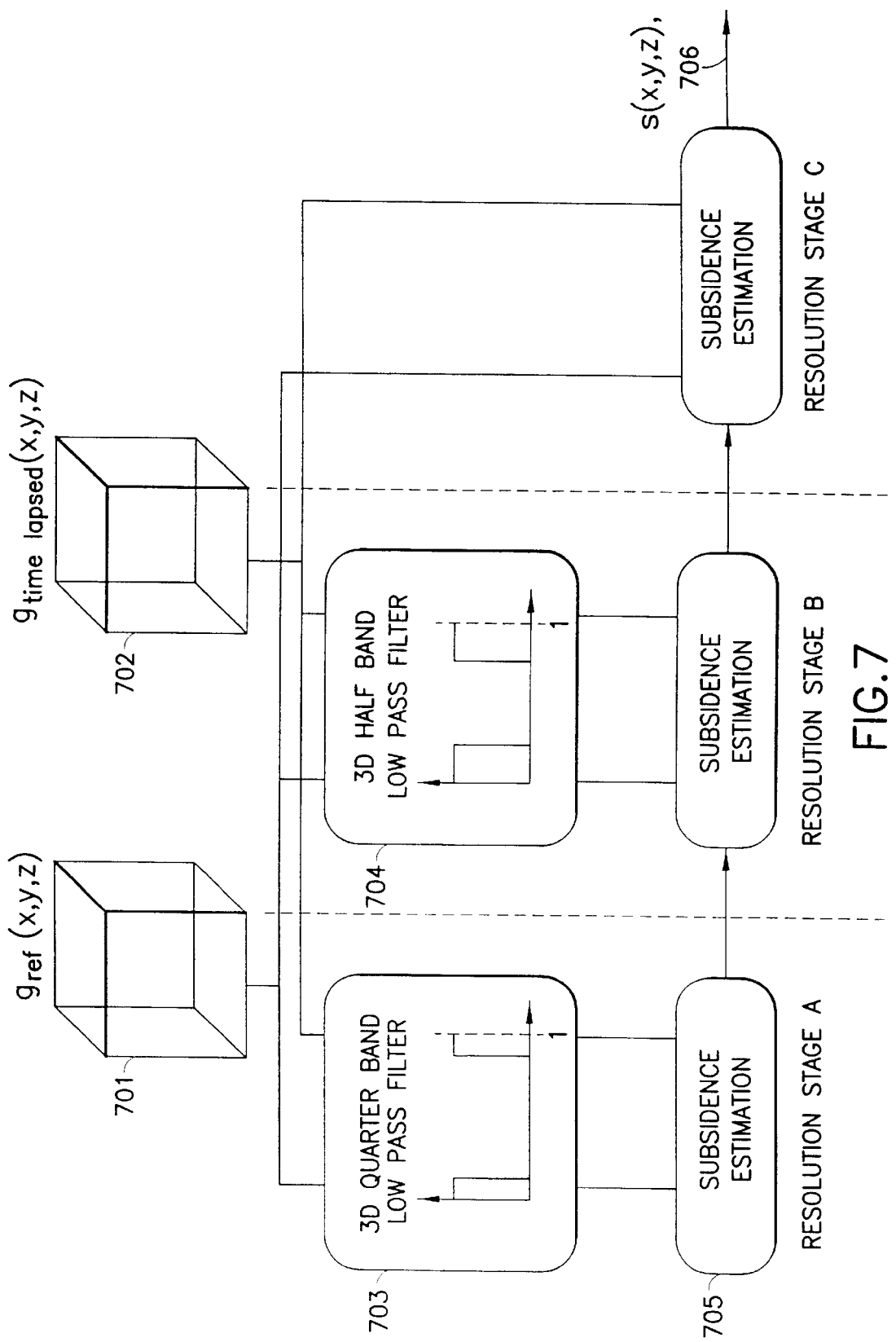
FIG. 7 is a more detailed diagram illustrating the implementation of a multi-resolution scheme to enhance the robustness of the subsidence and compaction estimate.

Referring to FIG. 7, the multi-resolution scheme is exemplified in more detail with a preferred embodiment of the invention having three resolution stages. At stage A, the two input data volumes 701 and 702 are filtered separately along each direction by a quarter band low pass filter 703 before performing the first subsidence estimation 705 using the iteration process described above. This subsidence estimate forms the initial values for the next resolution stage. Here, the two input volumes are filtered separately along each direction by a half band low pass filter 704 before subjecting these to the subsidence estimation 705. Again the resulting subsidence estimate is passed on as initial estimate to the last resolution step, which uses the input trace volumes in their unfiltered versions and renders the final subsidence estimate 706.

Figure 8:
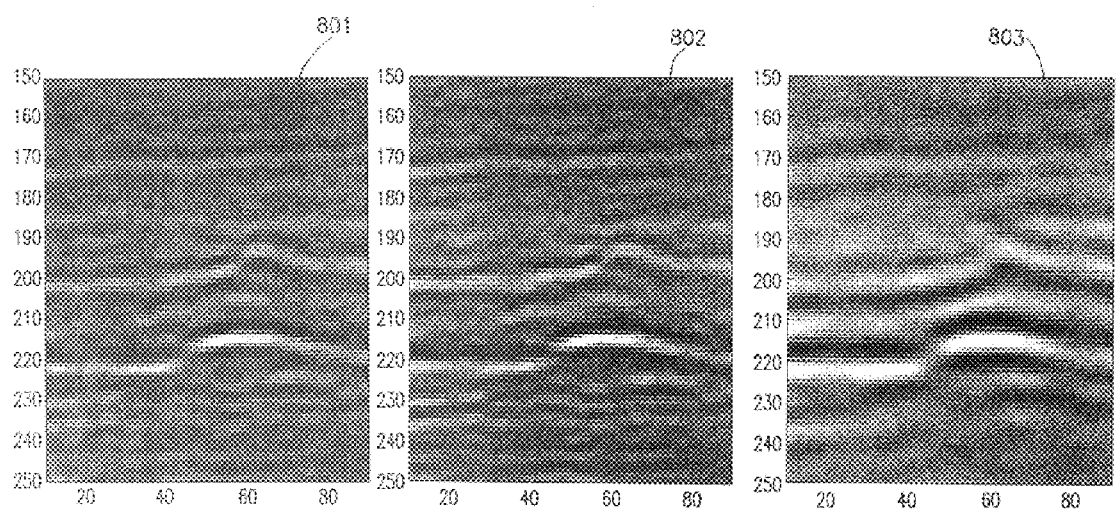
FIG. 8 shows a section of a seismic volume in its three resolution versions when subjected to the scheme presented in FIG. 7.

Referring to FIG. 8 there is shown sections of a 3D seismic sub-volume in its three versions according to the three resolution stages described above. The vertical axes correspond to depth measured in samples and the horizontal axes correspond to crosslines. First section 801 is a section of the 3D seismic volume with full band resolution. Second section 802 is a section of the 3D seismic volume separately filtered along the three dimensions with a half band low pass filter. Only a slight smoothing effect is apparent. Third section 803 is a section of the 3D seismic volume separately filtered along the three dimensions with a quarter band low pass filter. A significant smoothing effect is visible.

Figure 9:
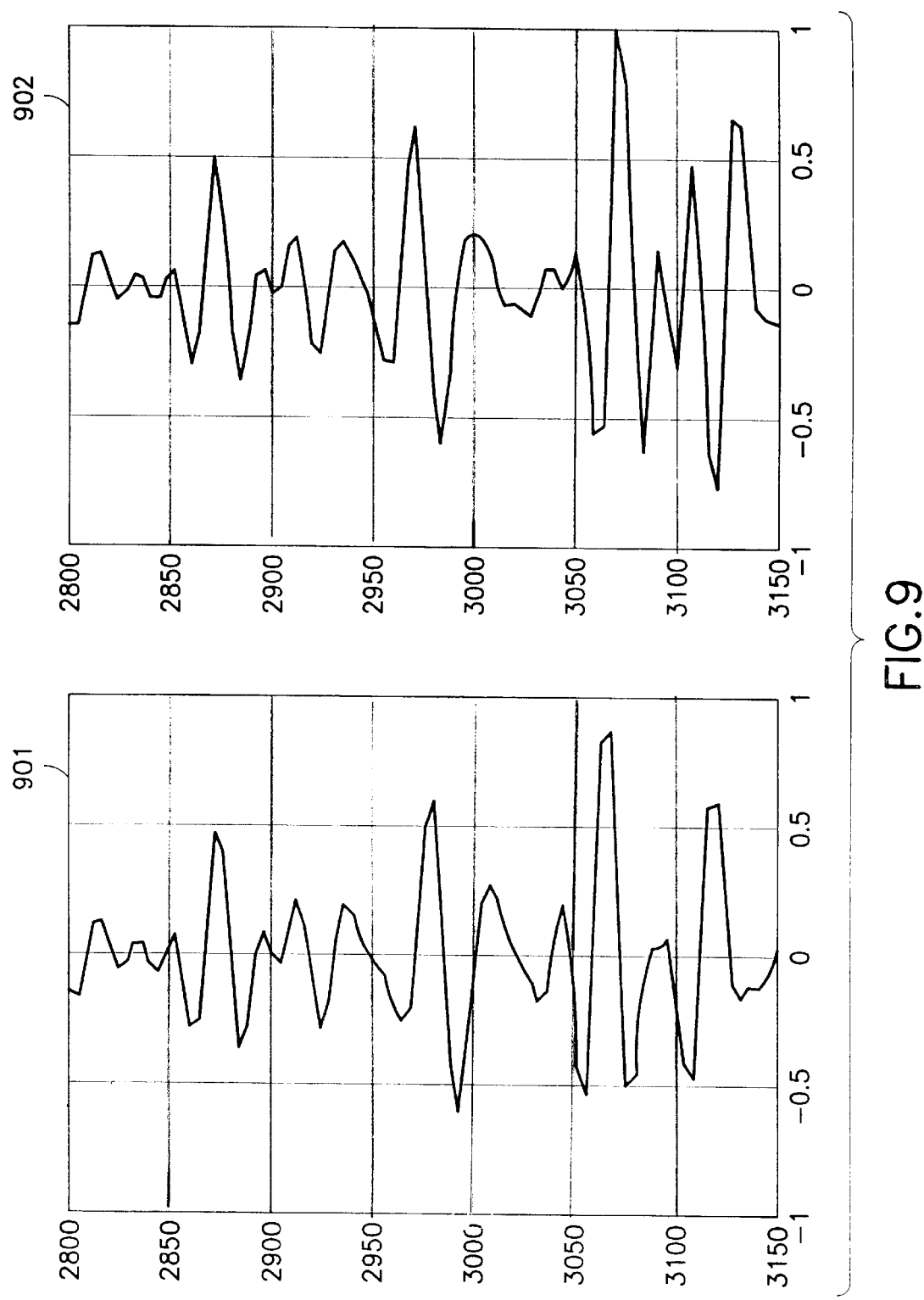
FIG. 9 shows uncompacted and compacted synthetic seismic traces.
Figure 10:
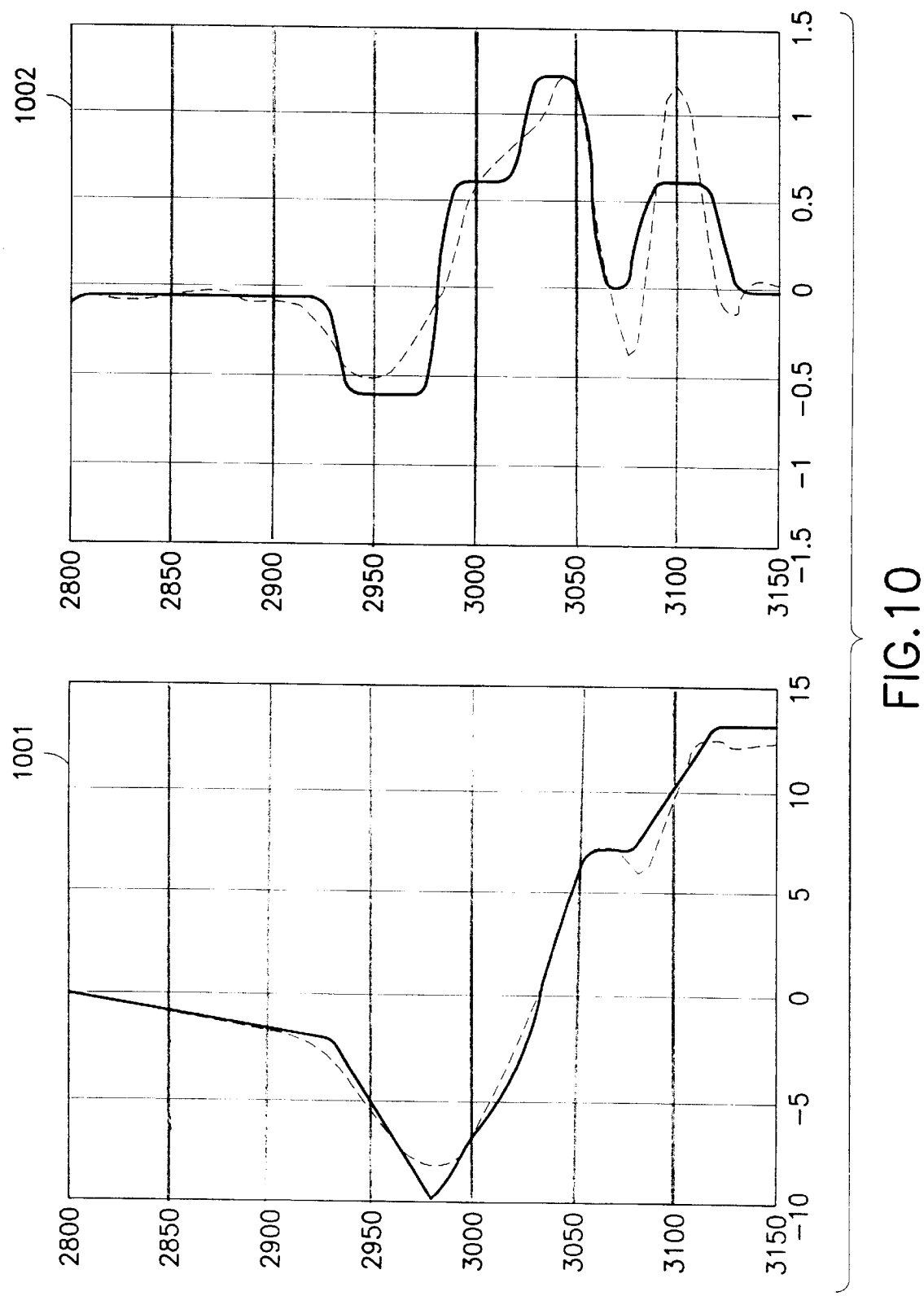
FIG. 10 compares true subsidence and estimated subsidence and true compaction and estimated compaction for the synthetic seismic traces in FIG. 9.

The performance of the described multi-resolution approach processed according to an embodiment of the current invention will now be shown through the use of synthetic seismic data. Two synthetic seismic traces are plotted in FIG. 9. First trace 901 is a synthetic seismic trace generated by convolving a reflectivity series with a wavelet. Second trace 902 is a synthetic seismic trace generated by compacting a reflectivity series and subsequently convolving this compacted reflectivity series with a wavelet. In FIG. 10, first display 1001 shows the true subsidence as a solid line and the estimated subsidence as a dashed line for the two synthetic traces of FIG. 9. Second display 1002 shows the true compaction as a solid line and the estimated compaction as a dashed line for the two synthetic traces shown in FIG. 9.

Alternatively, the subsidence estimate can be obtained using a wavelet transform scheme based on findings published by Christophe P. Bernard, "Discrete wavelet analysis: a new framework for fast optic flow computation" in Proceedings of the 5$^{th}$ European Conference on Computer Vision, vol. 1407 of Lecture Notes in Computer Science, pp 354–368, June 1998 and adapted to the purpose of the present invention. In a preferred embodiment, the subsidence at wavelet scale j is calculated as:

$$s_j(x,y,k) = 2^j \cdot \frac{\frac{1}{2}(\langle \psi'_{j,k}, g_{ref}(z)\rangle + \langle \psi'_{j,k}, g_{time-lapsed}(z)\rangle)^H \cdot (\langle \psi_{j,k}, g_{ref}(z)\rangle - \langle \psi_{j,k}, g_{time-lapsed}(z)\rangle)}{\alpha + \frac{1}{2}(\langle \psi'_{j,k}, g_{ref}(z)\rangle + \langle \psi'_{j,k}, g_{time-lapsed}(z)\rangle)^H \cdot \frac{1}{2}(\langle \psi'_{j,k}, g_{ref}(z)\rangle + \langle \psi'_{j,k}, g_{time-lapsed}(z)\rangle)}$$

Here, $\langle \psi_{j,k}, g(z)\rangle$ denotes the inner product of the wavelet $$\psi_{j,k} = 2^j \cdot \psi\left(\left[\frac{z-k}{2^j}\right]\right)$$

with the trace signal $g(z)$. In this notation, the lateral co-ordinates x,y of the seismic trace signal were omitted to obtain a less complex expression and in order to indicate that the wavelet transform is applied only along the depth (z) dimension. Furthermore, $\psi'_{j,k}$ denotes the derivative of the wavelet with respect to the z co-ordinate and .$^H$ denotes the conjugate complex of the indexed variable. Finally, $\alpha$ is a parameter to stabilise the expression in the presence of noise. Typically, values for $\alpha$ will depend on the wavelet scale j and choosing $\alpha \in [1,10] \cdot 2 \cdot 10^7/2^{4-j}$ produces beneficial results for seismic trace signals having an amplitude range of [−32768,32768] and being sampled at 4 ms. Yet, in another preferred embodiment, $\alpha$ will depend on the input data rather than being constant at a given scale. In such a case choosing $$\alpha = \alpha \cdot (\langle \psi_{j,k}, g_{ref}(z)\rangle + \langle \psi_{j,k}, g_{time-lapsed}(z)\rangle)^H \cdot (\langle \psi_{j,k}, g_{ref}(z)\rangle + \langle \psi_{j,k}, g_{time-lapsed}(z)\rangle)$$

with $\alpha \approx 1$–10 has proved to give satisfactory results for seismic data with an amplitude range of [−32768,32768] and a sample frequency of 4 ms.

Figure 12:
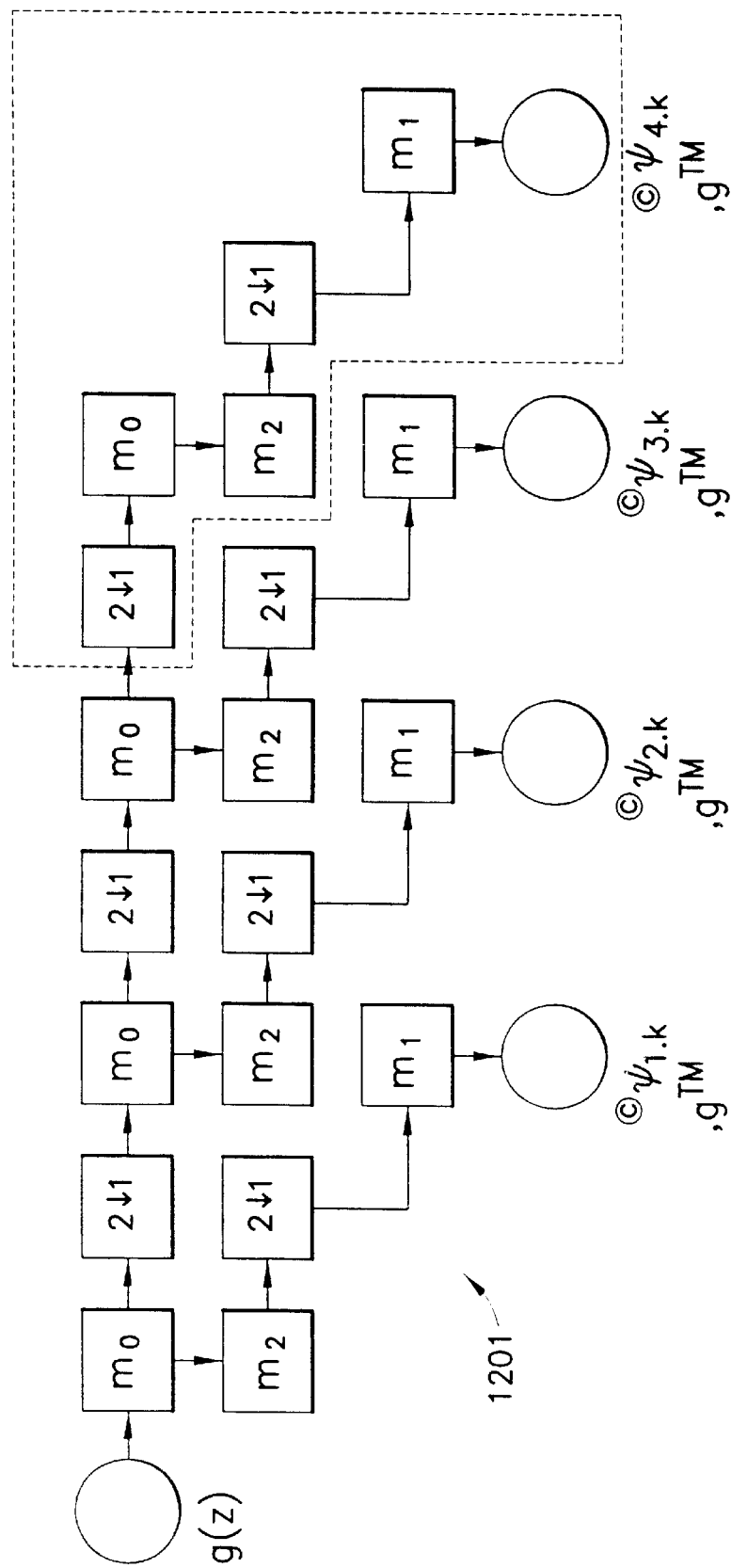
FIG. 12 illustrates the implementation of a wavelet transform by a cascade of digital FIR filters and subsampling operations.

As obvious to those skilled in the art, the inner product for different locations k and scales j can be produced by implementing the wavelet transform as an FIR filter scheme operating on the trace signal $g(z)=g(x,y,z)$, exemplified schematically as flowchart 1201 in FIG. 12. In a preferred embodiment, the wavelet may be chosen as a Deslauriers Debuc wavelet of order 3, though it should be understood that one may choose another order or another wavelet without leaving the scope of the present invention. For the third order Deslauriers Debuc wavelet, the FIR filter denoted $m_0$ in FIG. 12 has the filter coefficients [−0.0625, 0.0, 0.5625, 1.0000, 0.5625 0.0, −0.0625]. Correspondingly, the filter coefficients of $m_1$ are given as [−0.0625, 0.0, 0.5625, −1.0000, 0.5625 0.0, −0.0625]. The filter $m_2$ has the complex-valued coefficients [−0.0625, 0.0, −0.5625, −i, −0.5625 0.0, −0.0625], where i denotes the imaginary number $i=\sqrt{-1}$. As apparent to those skilled in the art, the filter step of $m_2$ approximates a Hilbert transform of the signal. This step may be omitted but is beneficial when handling oscillating signals like seismic reflection data. In addition, the filtering scheme includes several steps of subsampling denoted by i.e. 2↓1, where every second sample of the input sample sequence is discarded. Furthermore, when implementing the third order Deslauriers Debuc wavelet derivative $\psi'_{j,k}$, the coefficients of the filter $m_1$ will take on the values: [−0.1250, 0.1250, 1.1250, −3.1250, 3.1250, −1.1250, −0.1250, 0.1250], whereas the filter coefficients of $m_0$ become [−0.1250, 0.1250, 1.0000, 1.0000, 0.1250, −0.1250]. The filter coefficients of filter $m_2$ stay the same as above.

In another preferred embodiment of the invention, the above described wavelet filter scheme is used to estimate the subsidence $s_j$ at some high scale j (e.g. j=4 or 5) and subsequently refine the estimate by calculating the subsidence estimate at the next lower scale j−1 according to following formulae:

Decompose: $s_j = s_j^{int} + s_j^{res} \begin{cases} s_j^{int} = 2^{j-1} \cdot n \wedge n \in Z \\ s_j^{res} \in 2^{j-1} \cdot [-0.5, 0.5] \end{cases}$ Calculate:

$$Den = \alpha + \lambda_{j-1} \frac{1}{4} \Big( \langle \psi'_{j,k+s_{j+1}^{int}}, g_{time\text{-}lapsed}(z) \rangle + \langle \psi'_{j,k}, g_{ref}(z) \rangle \Big)^H \cdot$$

$$\Big( \langle \psi'_{j,k+s_{j+1}^{int}}, g_{time\text{-}lapsed}(z) \rangle + \langle \psi'_{j,k}, g_{ref}(z) \rangle \Big) +$$

$$\frac{1}{4} \Big( \langle \psi'_{j-1,k+s_j^{int}}, g_{time\text{-}lapsed}(z) \rangle + \langle \psi'_{j,k}, g_{ref}(z) \rangle \Big)^H \cdot$$

$$\Big( \langle \psi'_{j-1,k+s_j^{int}}, g_{time\text{-}lapsed}(z) \rangle + \langle \psi'_{j,k}, g_{ref}(z) \rangle \Big)$$

$$Nom = \lambda_{j-1} \cdot \frac{1}{4} \Big( \langle \psi'_{j,k+s_{j+1}^{int}}, g_{time\text{-}lapsed}(z) \rangle + \langle \psi'_{j,k}, g_{ref}(z) \rangle \Big)^H \cdot$$

$$\Big( \langle \psi'_{j,k+s_{j+1}^{int}}, g_{time\text{-}lapsed}(z) \rangle + \langle \psi'_{j,k}, g_{ref}(z) \rangle \Big) \cdot s_j^{res} \cdot 2^{1-j} +$$

$$\frac{1}{2} \Big( \langle \psi'_{j-1,k+s_j^{int}}, g_{time\text{-}lapsed}(z) \rangle + \langle \psi'_{j,k}, g_{ref}(z) \rangle \Big)^H \cdot$$

$$\Big( \langle \psi_{j-1,k+s_j^{int}}, g_{time\text{-}lapsed}(z) \rangle - \langle \psi_{j,k}, g_{ref}(z) \rangle \Big)$$

$$\hat{s}_{j-1}^{res}(x, y, k) = 2^{j-1} \frac{Nom}{Den}$$

$$s_{j-1} = s_j^{int} + \hat{s}_{j-1}^{res}$$

Here, the parameter $\lambda_j$ is used to balance information from two consecutive scales and will be adjusted in order to get a smooth subsidence estimate. Often choosing $\lambda_j \approx 0.1$ will produce beneficial results.

This refinement scheme is iterated until the finest scale j=1 is reached. In other cases, however, one will stop the refinement scheme at some higher scale j>1 to get a smoother estimate of the subsidence.

In still another embodiment, the user of the invention will apply a better conditioning of the involved equations by using the complex wavelet transform and substituting according to the two embodiments described above:

$(\langle \psi'_{j,k}, g_{time\text{-}lapsed}(z) \rangle + \langle \psi'_{j,k}, g_{ref}(z) \rangle) \rightarrow$ $(e^{-i \cdot s_{j+1} \cdot \omega_j/2} \langle \psi'_{j,k}, g_{time\text{-}lapsed}(z) \rangle + e^{i \cdot s_{j+1} \cdot \omega_j/2} \langle \psi'_{j,k}, g_{ref}(z) \rangle)$ respectively:

$(\langle \psi'_{j,k+s_{j+1}^{int}}, g_{time\text{-}lapsed}(z) \rangle + \langle \psi'_{j,k}, g_{ref}(z) \rangle) \rightarrow$ $(e^{-i \cdot s_{j+1}^{res} \cdot \omega_j/2} \langle \psi'_{j,k+s_{j+1}^{int}}, g_{time\text{-}lapsed}(z) \rangle + e^{i \cdot s_{j+1}^{res} \cdot \omega_j/2} \langle \psi'_{j,k}, g_{ref}(z) \rangle)$ $(\langle \psi'_{j-1,k}^{int}, g_{time\text{-}lapsed}(z) \rangle + \langle \psi'_{j-1,k}, g_{ref}(z) \rangle) \rightarrow$ $(e^{-i \cdot s_j^{res} \cdot \omega_{j-1}/2} \langle \psi'_{j-1,k+s_j^{int}}, g_{time\text{-}lapsed}(z) \rangle + i \cdot e \cdot \omega_j^{res}{}_{j-1}/2 \langle \psi'_{j-1,k}, g_{ref}(z) \rangle)$ Here, the frequency $\omega_j$ corresponds to the centre frequency of the wavelet at scale j and for the case of the third order Debuc Deslauriers wavelet transform it is appropriate to set $\omega_j = 2^{-j} \cdot 2.2934$.

Referring again to FIG. 6, an estimated subsidence data volume obtained by either of the processing schemes or still another processing scheme, can be written out to the geological database 601, or it can be further processed to arrive at a compaction estimate. Such a processing step 609 consists of taking the derivative with respect to the depth (along trace) direction.

$$c(x, y, z) = \frac{\partial}{\partial z} s(x, y, z)$$

Figure 11:
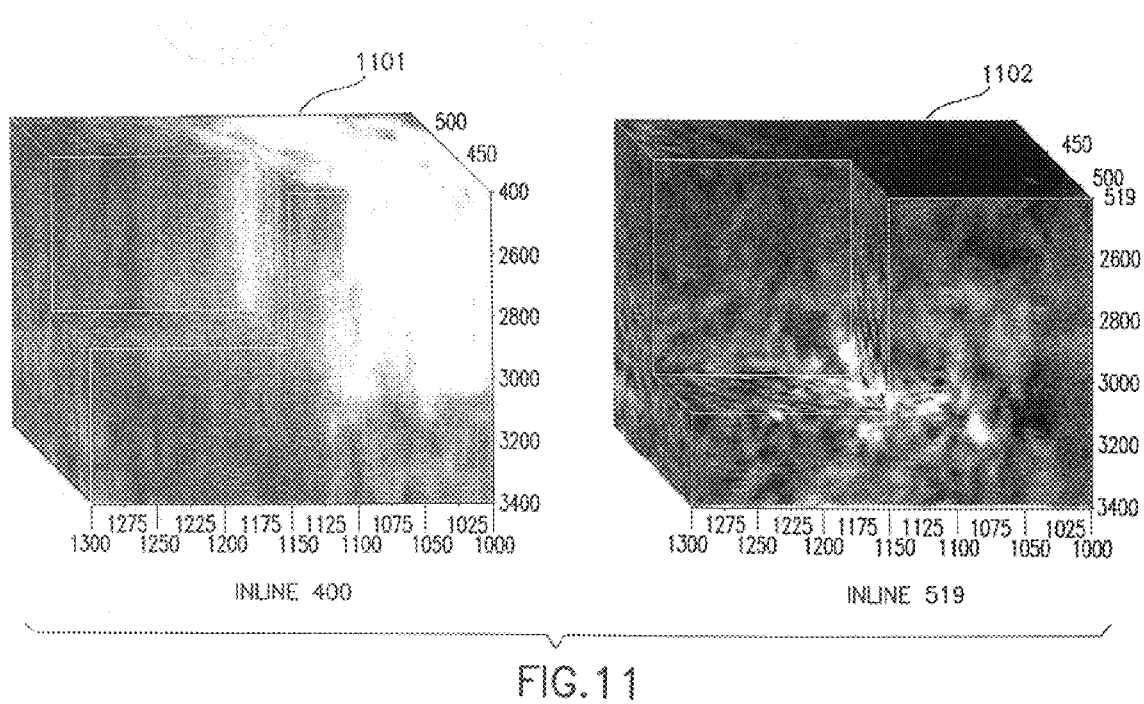
FIG. 11 displays example subsidence and compaction data volumes.

The derivative can be implemented using a finite difference scheme or, preferably, a higher order scheme to reduce noise artefacts. The so gained compaction data volume can then be directly written to the geological database 601 or subjected to some post processing scheme 610. Referring back to FIG. 10, second display 1002 displays the estimated compaction for the synthetic seismic trace example together with the true compaction. Further, referring to FIG. 11 there is given an example of how the so estimated data volumes of a subsidence cube 1101 and a compaction cube 1102 would typically be represented in a grey scale plot.

A particular post-processing scheme, which is part of the inventive system, can estimate a relative change of the acoustic impedance in the subsurface based on the calculated compaction. This can be achieved by mapping compaction onto acoustic impedance changes using an empirical mapping function. In particular and obvious to those familiar with the art repeated sonic, check-shot and density logs can be used to generate a repeated acoustic impedance log. Retrieving the estimated compaction values along the well trace allows the user of the invention to generate a cross-plot between compaction and relative impedance changes. Fitting a regression curve through the samples of the cross-plot establishes a parameterised mapping function. This function is subsequently used to map the estimated compaction data volume onto relative changes in acoustic impedance.

Alternatively, if no repeated well logs are available for the surveyed area, a user of the invention may use a parameterised model such as proposed by Gardner, et al. in "Formation Velocity and Density-The Diagnostic Basic for Stratigraphic Traps" Geophysics, Vol. 39 No. 6 (December 1974), pp. 770–771. This model relates density and seismic velocities through a nonlinear equation.

$$\rho = a \cdot v^b$$

Here $\rho$ refers to the density and v to the velocity of sound that governs the wave propagation. The parameters a and b are typically chosen from the analysis of this model using—not necessarily repeated—well log data or can be input upon experience of a user of the invention. Since the acoustic impedance is defined as:

$$Z = \rho v = a \cdot v^{b+1} = \rho \cdot b \sqrt{\frac{\rho}{a}}$$

small relative changes in the density will imply a relative change in acoustic impedance given by:

$$\frac{\partial Z}{Z} = \left(1 + \frac{1}{b}\right) \frac{\partial \rho}{\rho}$$

A second relation connecting the relative change in density with compaction can be in accordance with the invention modelled as:

$$\frac{\partial \rho}{\rho} = \left(1 + \frac{\rho_{fluid}}{\rho}\right)\frac{\partial V}{V}$$

where the relative change in volume, V, equals compaction. Further, it is assumed that compaction is due to a reduction of the fluid volume, whereas the total density $\rho$ and density $\rho_{fluid}$ of the fluid in the pore or fracture space is constant. The overall mapping function from compaction to acoustic impedance changes may thus be modelled as:

$$\frac{\partial Z}{Z} = \left(1 + \frac{1}{b}\right)\left(1 + \frac{\rho_{fluid}}{\rho}\right) \cdot c$$

As indicated above, the involved parameters will be set by the user of the invention either based on experience or based on well log measurements in the area of the survey. In particular, it might be beneficial to allow for variation of the parameters with depth and/or lithology.

Finally, an acoustic impedance change volume is obtained by applying the mapping function to each sample of the compaction data volume. Again, the result will be typically stored in the geological database and may be retrieved from there as partial input for a general acoustic impedance inversion scheme such as 'Best Feasible Approximation' a software module that forms part of the GeoFrame software system available from Schlumberger GeoQuest, Houston, Tex.

The inventive subsidence and compaction estimation process can be applied to differently processed seismic data signals and may be applied more generally and in fully accordance with the invention to data measured based on other physical principles than seismic wave propagation.

The foregoing descriptions of preferred and alternate embodiments of the present invention have been presented for purposes of illustration and description. They are not intended to be exhaustive or to limit the invention to the precise examples described. Many modifications and variations will be apparent to those skilled in the art. These embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

What is claimed is:

1. A method of processing first and second sets of data signals obtained through remotely sensing properties of the same subsurface area at different times, the method comprising the steps of:
   decomposing said first and second data sets into subvolumes of samples; and
   generating subsidence estimates indicating the amount and upward or downward direction the samples from said first data set need to be translated to obtain a new representation of said first data subvolume that maximally resembles said second subvolume.

2. A method as claimed in claim 1, further including the step of derivating said subsidence estimates along the vertical direction in order to generate samples indicating the relative local compaction of the subsurface.

3. A method as claimed in claim 1, in which said subsidence estimates are generated using a plurality of resolution stages, each resolution step consisting of low pass filtering said first and second data subvolumes before said subsidence estimates are generated and using a subsidence estimate of a previous resolution stage as an initial subsidence estimate for a current subsidence estimation stage.

4. A method as claimed in claim 1, in which said subsidence estimates are generated by iteratively updating a subsidence estimate with estimated increments.

5. A method as claimed in claim 4, where said subsidence increments are spatially smoothed with a lowpass filter.

6. A method as claimed in claim 4, in which the iteration process is continued until the estimated increments drop below a user defined threshold.

7. A method as claimed in claim 6, where said threshold is set to 1% of the total subsidence estimate at the current iteration.

8. A method as claimed in claim 1, in which said subsidence estimates are derived using a formula of the form:

$$s_i(x, y, z) = s_{i-1}(x, y, z) + \frac{g_{z,i}(x, y, z) \cdot \Delta g_i(x, y, z)}{\alpha + g_{z,i}(x, y, z) \cdot g_{z,i}(x, y, z)} + \beta(\bar{s}_{i-1}(x, y, z) - s_{i-1}(x, y, z))$$

where:

$$g_{z,i}(x, y, z) = \frac{1}{2}\left(\frac{\partial}{\partial z}g_{ref}(x, y, z) + \frac{\partial}{\partial z}g_i(x, y, z)\right),$$

$$\Delta g_i(x, y, z) = g_i(x, y, z) - g_{ref}(x, y, z), \text{ and}$$

$$\bar{s}_{i-1}(x, y, z) = \sum_{\xi=-M}^{M} s_{i-1}(x, y, z + \xi).$$

9. A method as in claim 8, in which $$\frac{\partial}{\partial z}g_{ref}(x, y, z) \text{ and } \frac{\partial}{\partial z}g_i(x, y, z)$$

are approximated using a cubic polynomial approximation scheme.

10. A method as in claim 8, in which $$\frac{\partial}{\partial z}g_{ref}(x, y, z) \text{ and } \frac{\partial}{\partial z}g_i(x, y, z)$$

are approximated using a Gaussian approximation scheme.

11. A method as claimed in claim 8, in which the value of the regularisation parameter $\alpha$ is chosen between [10,100] and $\beta$ is chosen between [0.8 0.95] when said first and second subset of data signals have amplitude ranges normalised to the interval [0, 1].

12. A method as claimed in claim 1, in which said subsidence estimates are generated by applying a wavelet scheme and calculating the subsidence at scale j according to the formula:

$$s_j(x,y,k) = 2^j \cdot \frac{\frac{1}{2}(\langle \psi'_{j,k}, g_{ref}(z)\rangle + \langle \psi'_{j,k}, g_{time-lapsed}(z)\rangle)^H \cdot (\langle \psi_{j,k}, g_{ref}(z)\rangle - \langle \psi_{j,k}, g_{time-lapsed}(z)\rangle)}{\alpha + \frac{1}{2}(\langle \psi'_{j,k}, g_{ref}(z)\rangle + \langle \psi'_{j,k}, g_{time-lapsed}(z)\rangle)^H \cdot \frac{1}{2}(\langle \psi'_{j,k}, g_{ref}(z)\rangle + \langle \psi'_{j,k}, g_{time-lapsed}(z)\rangle)}$$

where the inner product $\langle \psi_{j,k}, g(z)\rangle$ of the wavelet $$\psi_{j,k} = 2^j \cdot \psi\left(\left\lfloor\frac{z-k}{2^j}\right\rfloor\right)$$

with a trace signal $g(z)$ or the inner product of the wavelet derivative $$\psi'_{j,k} = \frac{\partial}{\partial z} 2^j \cdot \psi\left(\left\lfloor\frac{z-k}{2^j}\right\rfloor\right)$$

with a trace signal are implemented by a digital filtering scheme.

13. A method as claimed in claim 12 in which the digital filtering scheme consists of the following steps:
  i) filter the input signal with a low pass filter $m_0$
  ii) subsample the output of said filter $m_0$ by a factor of two and go to step i) to continue with the next wavelet scale; or proceed with
  iii) filtering the output of said filter $m_0$ with a complex valued filter $m_2$ approximating a Hilbert transform
  iv) subsample by a factor of two
  v) filter the result with a high pass filter $m_1$ and render the inner product of the wavelet and the trace signal.

14. A method as claimed in claim 13, in which said digital filters $m_0$, $m_1$, $m_2$ are chosen to implement a Deslauriers Debuc wavelet of third order by setting the filter coefficients to:
  $m_0$=[−0.0625, 0.0, 0.5625, 1.0000, 0.5625 0.0, −0.0625]
  $m_1$=[−0.0625, 0.0, 0.5625, −1.0000, 0.5625 0.0, −0.0625]
  $m_2$=[−0.0625, 0.0, −0.5625, −i, −0.5625 0.0, −0.0625]
  for the implementation of the wavelet itself and to
  $m_0$=[−0.1250, 0.1250, 1.0000, 1.0000, 0.1250, −0.1250]
  $m_1$=[−0.1250, 0.1250, 1.1250, −3.1250, 3.1250, −1.1250, −0.1250, 0.1250]
  $m_2$=[−0.0625, 0.0, −0.5625, −i, −0.5625 0.0, −0.0625]
  for the implementation of derivative of the wavelet.

15. A method as claimed in claim 12, in which the regularisation parameter $\alpha$ depends on the wavelet scale $j$ and is chosen from $\alpha \in [1,10] \cdot 2 \cdot 10^7 / 2^{4-j}$ for seismic trace signals being normalised to an amplitude range of [−32768, 32768] and being sampled at 4 ms.

16. A method as claimed in claim 12, in which the regularisation parameter $\alpha$ is chosen as:

$$\alpha = \alpha \cdot (\langle \psi_{j,k}, g_{ref}(z)\rangle + \langle \psi_{j,k}, g_{time-lapsed}(z)\rangle)^H \cdot (\langle \psi_{j,k}, g_{ref}(z)\rangle + \langle \psi_{j,k}, g_{time-lapsed}(z)\rangle)$$

with $\alpha \approx 1$–10 for seismic data being normalised to an amplitude range of [−32768,32768] and a sample frequency of 4 ms.

17. A method as claimed in claim 12, in which the subsidence is estimated iteratively over consecutive wavelet scales $j$ starting at some high scale e.g. $j=5$ and where the following steps are performed for decreasing scales $j=4,3,2,1$:

Decompose: $s_j = s_j^{int} + s_j^{res}$ $\begin{cases} s_j^{int} = 2^{j-1} \cdot n \wedge n \in Z \\ s_j^{res} \in 2^{j-1} \cdot [-0.5, 0.5] \end{cases}$ Calculate:

$$Nom = \lambda_{j-1} \cdot \frac{1}{4}\left(\left(\psi'_{j,k+s_{j+1}^{int}}, g_{time-lapsed}(z)\right) + \langle \psi'_{j,k}, g_{ref}(z)\rangle\right)^H \cdot$$

$$\left(\left(\psi'_{j,k+s_{j+1}^{int}}, g_{time-lapsed}(z)\right) + \langle \psi_{j,k}, g_{ref}(z)\rangle\right) \cdot s_j^{res} \cdot 2^{1-j} +$$

$$\frac{1}{2}\left(\left(\psi'_{j-1,k+s_j^{int}}, g_{time-lapsed}(z)\right) + \langle \psi'_{j,k}, g_{ref}(z)\rangle\right)^H \cdot$$

$$\left(\left(\psi_{j-1,k+s_j^{int}}, g_{time-lapsed}(z)\right) - \langle \psi_{j,k}, g_{ref}(z)\rangle\right)$$

$$\hat{s}_{j-1}^{res}(x,y,k) = 2^{j-1} \frac{Nom}{Den}$$

$$s_{j-1} = s_j^{int} + \hat{s}_{j-1}^{res}$$

18. A method as claimed in claim 1, in which said remotely sensed data signals are collected during time lapsed seismic surveys.

19. A method as claimed in claim 18, in which said acquired time lapsed seismic data volumes are processed using one or more of the following processes: data sorting, amplitude scaling, frequency filtering, lateral interpolation, binning, multiple suppression, statics reduction, normal moveout correction, dip moveout correction, prestack migration, stacking, poststack migration, and attribute generation.

20. A method as claimed in claim 19, in which said generation of attributes consists of taking the envelope of a complex seismic trace.

21. A method as claimed in claim 18, in which said sets of seismic data signals are 2D sections extracted from larger 3D sets of seismic data.

22. A method as claimed in claim 21, in which said 2D sections can be characterised as either inline, crossline, curvilinear line, or random line.

23. A method as claimed in claim 2 wherein the compaction volume estimate is postprocessed in order to relate it to relative changes in the acoustic impedance.

24. A method as claimed in claim 23, in which a relation function between the compaction estimate and the relative change in acoustic impedance is obtained through a regression scheme applied on one or more well log traces.

25. A method as claimed in claim 23, in which the relation between a compaction estimate data volume and a relative change in acoustic impedance is obtained by applying a formula of the form:

$$\frac{\partial Z}{Z} = \left(1 + \frac{1}{b}\right)\left(1 + \frac{\rho_{fluid}}{\rho}\right) \cdot c.$$

26. A method as claimed in claim 24, in which said volume of relative change in acoustic impedance is used as a partial input to a general acoustic impedance inversion scheme.

* * * * *